United States Patent [19]

Dunn

[11] 4,109,063

[45] Aug. 22, 1978

[54] COMPOSITE BODY

[75] Inventor: Bruce S. Dunn, Schenectady, N.Y.

[73] Assignee: General Electric Company, Schenectady, N.Y.

[21] Appl. No.: 807,406

[22] Filed: Jun. 17, 1977

[51] Int. Cl.$^2$ .............................................. H01M 2/02
[52] U.S. Cl. ...................................... 429/30; 429/193; 428/469; 428/539; 428/409
[58] Field of Search ...................................... 429/30–33, 429/104, 191, 193, 185

[56] References Cited

U.S. PATENT DOCUMENTS

| | | | |
|---|---|---|---|
| 3,397,278 | 8/1968 | Pomerantz | 174/52 |
| 3,901,733 | 8/1975 | Toy | 429/193 |
| 3,960,596 | 6/1976 | Mitoff et al. | 429/185 |

Primary Examiner—John H. Mack
Assistant Examiner—H. A. Feeley
Attorney, Agent, or Firm—P. R. Webb, II; J. T. Cohen; M. Snyder

[57] ABSTRACT

A composite body has a substrate with opposite major surfaces, the substrate has a solid ion-conductive electrolyte material region and at least a portion of at least one major surface of a solid ion-insulating material region, and at least one moderately deformable metallic element bonded directly to the ion-insulating material of the substrate, the metal of the metallic element different from the metal of the mobile ions of the solid ion-conductive electrolyte material region.

8 Claims, 3 Drawing Figures

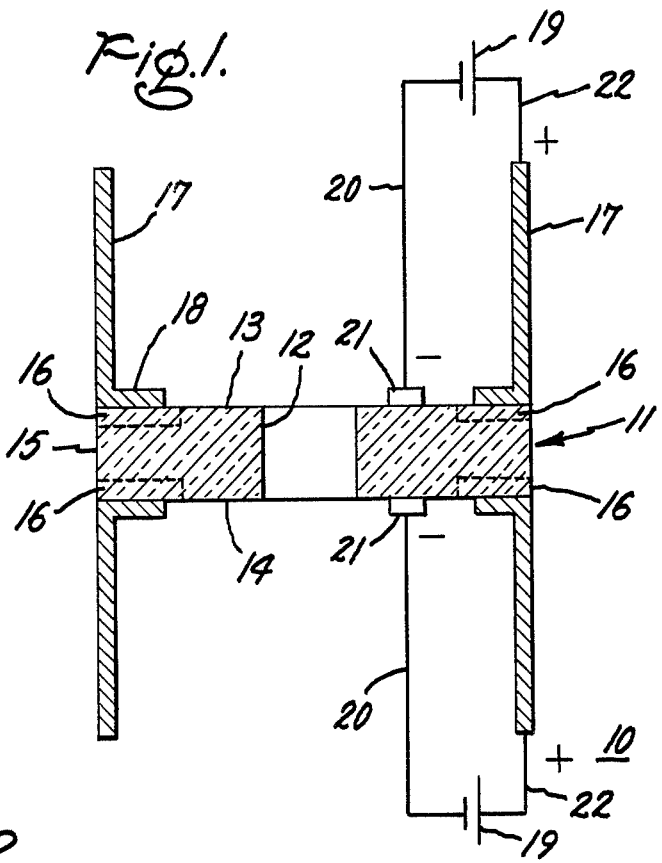
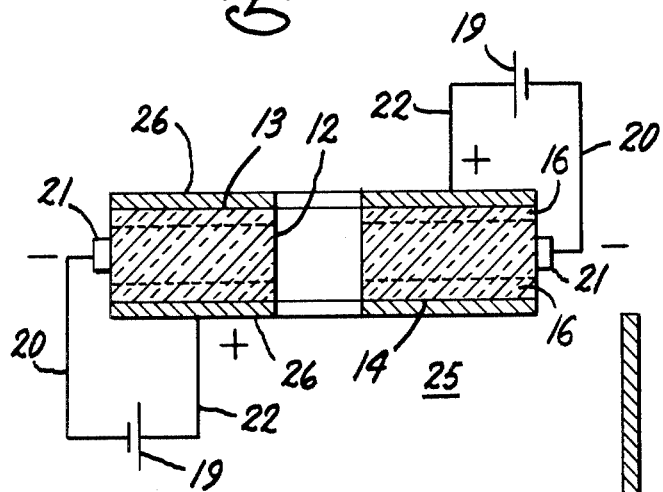
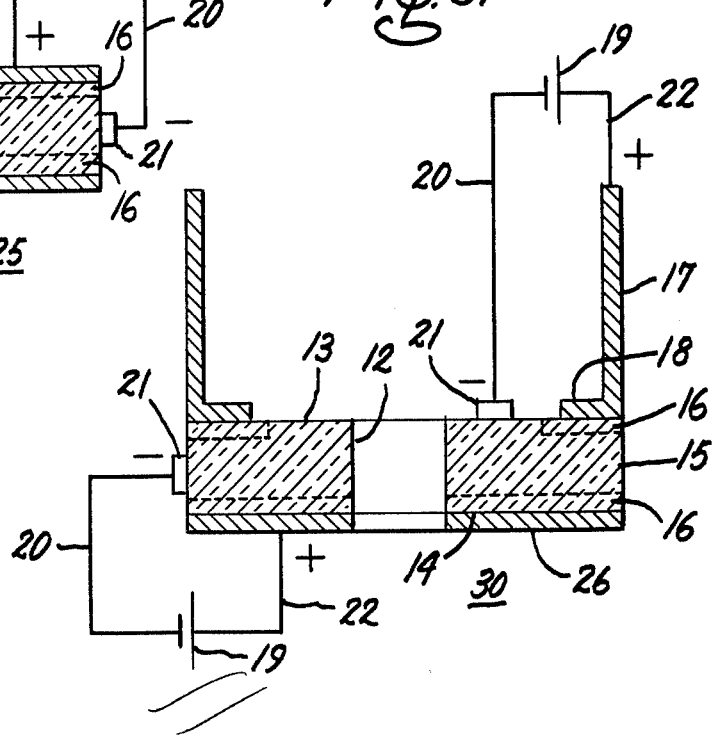

COMPOSITE BODY

The present invention relates to a composite body and more particularly to a composite body having a substrate with regions of both ion-conducting and ion-insulating materials, and at least one moderately deformable metallic element bonded directly to the ion-insulating material of the substrate.

Reference is made to copending patent application Ser. No. 807,407, filed June 13, 1977, and entitled "A Method of Bonding A Metallic Element to a Solid Ion-Conductive Electrolyte Material Element" which describes a method for forming the "Composite Body" of the present application.

Reference is made to copending patent application Ser. No. 807,377, filed June 17, 1977, and entitled "Composite Body, Method of Forming, and Method of Bonding" which describes another method for which can be employed to form the "Composite Body" of the present application. Both of these applications are assigned to the same assignee as the present application.

In U.S. Pat. No. 3,397,278 — Pomerantz, entitled "Anodic Bonding" and U.S. Pat. No 3,417,459 — Pomerantz et al., entitled "Bonding Electrically Conductive Metals To Insulators" there are described methods for bonding electrically conducting metals to insulators. The methods include placing the metal and insulator to be bonded in close surface contact, heating the insulator element, thus rendering it electrically conductive, applying a voltage across the elements and passing a low electrical current through the composite for a short time. The insulator element is heated by a conductive platen to provide sufficient electrical conductivity during the application of the voltage to effect the bonding of the conductive element to the insulator.

My present invention is directed to a composite body which has a substrate with regions of both ion-conducting and ion-insulating materials, and at least one moderately deformable metallic element bonded directly to the ion-insulating material of the substrate as opposed to the articles formed by the methods in the above last two referenced patents.

The primary object of my invention is to provide a composite body which is useful in various types of batteries and fuel cells such as, for example, a sodium-sulfur battery. Such a sodium-sulfur battery is described in U.S. Pat. No. 3,960,596 — Mitoff et al., entitled "Battery Casing and Hermetically Sealed Sodium-Sulfur Battery." This patent is assigned to the same assignee as the present application.

In accordance with one aspect of my invention, a composite body comprises a substrate with opposite major surfaces, the substrate comprises a solid ion-conductive electrolyte material region and at least a portion of at least one major surface of a solid ion-insulating material region, and at least one moderately deformable metallic element bonded directly to the ion-insulating material of the substrate, the metal of the metallic element different from the metal of the mobile ions of the solid ion-conductive electrolyte material region.

These and various other objects, features, and advantages of the invention will be better understood from the following description taken in connection with the accompanying drawing in which:

FIG. 1 is a sectional view of a composite body made in accordance with my invention;

FIG. 2 is a sectional view of a modified composite body; and

FIG. 3 is a sectional view of a further modified composite body.

In FIG. 1 of the drawing, there is shown generally at 10 a composite body made in accordance with my invention. Composite body 10 has s substrate 11 with a central aperture 12 therethrough and opposite major surfaces 13 and 14. Substrate 11 has a solid ion-conductive electrolyte material region 15 of sodium beta-alumina and portions of both major surfaces of solid ion-insulating material regions 16 of an aluminum substituted beta-alumina. A pair of moderately deformable metallic elements 17 in the form of aluminum casings with opposite open ends are provided. Each casing has a flange 18 at one open end thereof. Flange 18 of each metal casing 17 is bonded directly to the aluminum substituted beta-alumina region 16 of substrate 11. While flange 18 is shown turned inwardly, it will be appreciated that such flange can be turned outwardly. A pair of casings 17 are thus shown bonded to substrate 11 in this figure. If desired, only one casing 17 can be joined to the aluminum ion-insulating region 16 of one major surface of substrate 11. As it will be discussed below concerning the method of joining these metal casings to the substrate, the casings 17 can be joined individually or simultaneously to the substrate. Further there is shown in this figure a pair of power sources in the form of batteries 19. Each battery 19 has its negative lead 20 attached to a cathode which is graphite paint 21 applied to the respective surface of substrate 11. Each battery 19 has its positive lead 22 attached to the anode which is the metallic casing 17. As it will be further described below, an electric potential is applied across each aluminum casing and the substrate from its respective power source to form an effective bond between the casing and the substrate. The resulting structure is a composite body made in accordance with my invention.

In FIG. 2 of the drawing, there is shown a modified composite body made in accordance with my invention. Composite body 25 has a substrate 11 with a central aperture 12 therethrough and opposite major surfaces 13 and 14. Substrate 11 has a solid ion-conductive electrolyte material region 15 of sodium beta-alumina and both major surfaces of solid ion-insulating material regions 16 of an aluminum substituted beta-aluminum. A pair of moderately deformable metallic elements 26 of aluminum foil are bonded directly to the respective aluminum ion-insulating material regions 16 of substrate 11. A pair of batteries 19 and respective leads are shown which are similar to the batteries and leads shown in FIG. 1. The resulting structure is a composite body made in accordance with my invention.

In FIG. 3 of the drawing, there is shown at 30 a composite body made in accordance with my invention. Composite body 30 has a substrate 11 with a central aperture therethrough and opposite major surfaces 13 and 14. Substrate 11 has a solid ion-conductive electrolyte material region 15 of sodium beta-alumina and, portions of one major surface and the other major surface of solid insulating material regions 16 of an aluminum substituted beta-alumina. A moderately deformable metallic element 17 in the form of a metal casing is bonded by means of its flange 18 to the aluminum substituted beta-alumina region on one major surface of substrate 11. A moderately deformable metallic element 26 of aluminum foil is bonded to the aluminum substituted beta-alumina region 16 on the opposite surface of substrate 11. Similar batteries 19 and leads are shown as in previous FIGS. 1 and 2. The resulting structure is a composite body made in accordance with my invention.

I found that I could form a composite body by bonding a metallic element to a solid ion-conductive electrolyte material element. Such a metallic element must be moderately deformable. The electrolyte material element must contain mobile ions of a metal different from the metallic element. The method of my copending patent application Ser. No. 807,407 can be employed to form the composite body. The method comprises juxtaposing the major surfaces of the elements in close surface contact relationship, applying an electric potential across the juxtaposed elements to pass a finite current of low amperage through the juxtaposed elements, to convert a surface portion of the ion-conductive electrolyte material element adjacent the metallic element to an ion-insulating material and to effect bonding between the juxtaposed surfaces.

A solid ion-conductive electrolyte material is an ideal material for a composite body which has outer metallic casings sealed to ion-insulating material regions of the opposite surfaces thereof for use in a sodium-sulfur battery. While a solid ion-conductive electrolyte material element provides an ideal material for such a composite body from the standpoint of minimizing thermal stress and avoiding corrosion problems, such a material is ion-conductive as opposed to being insulating. Thus, this material is not useful as a flange in a sodium-sulfur battery. The exposed areas of metal contact to the electrolyte material element would act as shorted sodium-air seals forming $Na_2O$ and $NaOH$ at the junction and would eventually destroy the flange.

I found that my method of bonding could be employed since a surface portion of the electrolyte material element adjacent the metallic element is converted to an ion-insulating material. Thus, an ion-insulating region is positioned between the ion-conductive region of the electrolyte material and the metallic element.

My method includes employing a potential across the elements at ambient or elevated temperatures. My method includes bonding one major surface of the electrolyte element to a deformable metallic element. A portion of one major surface of the electrolyte material element can also be bonded to the deformable metallic element. Additionally, both major surfaces or a portion of both major surfaces of the electrolyte material element can be bonded to deformable metallic elements. Further, one major surface of the electrolyte material element can be bonded to a deformable metallic element while a portion of the other major surface of the electrolyte material element can be bonded to a second deformable metallic element. Thus, a variety of composite bodies made in accordance with my invention can be formed by this method.

A variety of materials can be employed for the metallic elements. Such materials include various types of steels, aluminum, aluminum alloys, copper, copper alloys, silver, silver alloys, noble metals, molybdenum and silicon. The only requirement is that the metal must be moderately deformable. Various solid ion-conductive electrolyte material elements can be employed for the element. The electrolyte material element must contain mobile ions of a metal different from the metallic element. Suitable electrolyte materials include beta-alumina, which term is used in the present application to include beta-alumina, beta"-alumina, mixtures thereof, and related compounds. For example, suitable beta-aluminas include lithium beta-alumina, hydronium beta-alumina, and silver beta-alumina. Other electrolytes include those based on silver, such as silver iodide, or silver rubidium iodide, or on lithium, such as, lithium iodide.

While my method is particularly adapted to forming a flange of a solid ion-conductive electrolyte material which has at least one aperture therethrough to which outer metallic casings are sealed to the opposite surfaces thereof for use in the sodium-sulfur battery, my method is also applicable to bonding such an electrolyte material to metallic elements to form a solid electrolyte and the metal container therefore for use in various solid-state batteries and fuel cells. Thus, the solid ion-conductive electrolyte material might be in the form of a disc of this material with one or more apertures therethrough to provide a flange for use in a sodium-sulfur battery. In various solid-state batteries and fuel cells, the solid ion-conductive electrolyte material would generally be in the form of a disc or flat material.

My method of bonding is described below for forming a flange with outer metallic casings sealed thereto for use in a sodium-sulfur battery. A solid ion-conductive electrolyte material element of sodium beta-alumina is employed which has a single aperture through its center thus providing a flange or ring configuration. It will be appreciated that the electrolyte material can have a plurality of apertures therethrough. A pair of moderately deformable metallic elements of aluminum are provided which are in the form of casings having opposite open ends and a flange portion at one end of each casing. The flange portions of the casings are positioned against opposite major surfaces of the sodium beta-alumina element. Each aluminum casing provides an anode, while graphite paint applied to the same major surface of the sodium beta-alumina electrolyte provides a cathode. A power source in the form of a battery 19 has its negative lead 20 attached to the cathoe 21, while its positive lead 22 is attached to the anode 17. Such a power source with its associated leads is provided for opposite surfaces of the sodium beta-alumina. An electric potential is applied across each aluminum casing and the sodium beta-alumina electrolyte from the power source. An electric potential can be applied from both power sources at the same time to thereby pass a finite current of low amperage through the adjacent metallic and sodium beta-aluminum electrolyte elements. The potential is applied at ambient or elevated temperatures. A surface portion of each major surface is converted to an aluminum substituted beta-alumina, an ion-insulating material. Effective bonding between the metallic casings and the initial sodium beta-alumina electrolyte material can be accomplished by applying a current density of from 0.5 to 2.0 milliamperes per $cm^2$ for a period of time from 0.5 to 2 hours. If desired, each metallic casing can be bonded to the sodium beta-alumina electrolyte separately. The application of the potential across the elements converts a surface portion of the sodium beta-alumina electrolyte to an aluminum ion-insulating material which is positioned adjacent the flange of the aluminum casing. In this manner bonding is effected between the respective flanges and the aluminum substituted beta-alumina. It will, of course, be appreciated that only one aluminum casing might be bonded to one major surface of the sodium beta-alumina. The resulting structure is a composite body comprising a substrate with opposite major surfaces, the substrate comprising a solid ion-conductive electrolyte material region and at least a portion of at least one major surface of a solid ion-insulating material region, and at least one moderately deformable metallic element bonded directly to the ion-insulating material of the substrate, the metal of the metallic element different from the metal of the mobile ions of the solid ion-conductive electrolyte material region. This composite body is made in accordance with my invention.

My method includes also bonding one or both major surfaces of the sodium beta-alumina with a deformable metallic element such as aluminum foil. The foil is placed adjacent one or both surfaces of a sodium beta-alumina disc with a center aperture. The aluminum foil provides an anode, while a cathode is provided by graphite conductive paint applied to the sodium beta-alumina. A power source, such as a battery, with appropriate leads to the aluminum foil and to the cathode is employed to provide the electric potential across the aluminum foil or foils and the sodium beta-alumina. The resulting structures are composite bodies made in accordance with my invention. In the manufacture of batteries, the metallic casings or containers are brazed or welded to the respective foils.

My method includes further bonding a deformable metallic element such as aluminum foil to one surface of a sodium beta-alumina containing an aperture therethrough while the other surface of the sodium beta-alumina is bonded to a metallic casing of aluminum. The same type of power source and circuit is employed in this variation of my method. The resulting structure is a composite body made in accordance with my invention.

Examples of composite bodies made in accordance with my invention are set forth:

EXAMPLE I

A composite body is made by providing a solid ion-conductive electrolyte material element of sodium beta-alumina which has a single aperture through its center thus providing a flange or ring configuration. A pair of moderately deformable metallic elements of aluminum are provided in the form of casings having opposite open ends and a flange portion at one end of each casing. The flange portions of the casings are positioned against opposite major surfaces of the sodium beta-alumina element. Each aluminum casing provides an anode, while graphite paint applied to the sodium beta-alumina electrolyte provides a cathode. The assembly of the sodium beta-alumina element and the aluminum casings is heated in a furnace at a temperature of 500° C. A power source in the form of a battery is provided for each cathode and anode pair. The negative lead of the battery is attached to the cathode, while the positive lead is attached to the anode. An electric potential is applied across each aluminum casing and the sodium beta-alumina electrolyte at the same time to thereby pass a finite current of low amperage through the adjacent metallic and sodium beta-alumina electrolyte elements. Effective bonding between the metallic casings and the sodium beta-alumina electrolyte element is accomplished by a current density of one milliampere per square centimeter for a period of one hour. The surface portion of the sodium beta-alumina electrolyte is converted to an aluminum ion-insulating material which is positioned adjacent each flange of the aluminum casing.

EXAMPLE II

A composite body was made as in Example I except that each of the two aluminum casings was separately bonded to the opposite major surfaces of the sodium beta-alumina element.

EXAMPLE III

A composite body was made as in Example I except that only one aluminum casing was bonded to a single major surface of the sodium beta-alumina element, and the temperature employed was 400° C.

EXAMPLE IV

A composite body was made by providing a solid ion-conductive electrolyte material element of sodium beta-alumina which has a single aperture through its center thus providing a flange or ring configuration. A pair of moderately deformable metallic elements of aluminum were provided in the form of aluminum foils. The foils were positioned against opposite major surfaces of the sodium beta-alumina element. Each foil provided an anode, while graphite paint applied to the sodium beta-alumina electrolyte provided a cathode. The assembly of the sodium beta-alumina element and the aluminum foils was heated in a furnace at a temperature of 525° C. A power source in the form of a battery was provided for each cathode and anode pair. The negative lead of the battery was attached to the cathode, while the positive lead was attached to the anode. An electric potential was applied across each foil and the sodium beta-alumina electrolyte at the same time to thereby pass a finite current of low amperage through the adjacent metallic and sodium beta-alumina electrolyte elements. Effective bonding between the foils and the sodium beta-alumina electrolyte element was accomplished by applying a current density of one milliampere per square centimeter for a period of one hour. The surface portion of the sodium beta-alumina electrolyte was converted to an aluminum ion-insulating material which is positioned adjacent each foil of the aluminum casing.

EXAMPLE V

A composite body was made as in Example IV except that each of the two aluminum foils was separately bonded to the opposite major surfaces of the sodium beta-alumina element, and the temperature employed was 100° C.

EXAMPLE VI

A composite body was made as in Example IV except that only one aluminum foil was bonded to a single major surface of the sodium beta-alumina element, and the temperature employed was 25° C.

EXAMPLE VII

A composite body is made by providing a solid ion-conductive electrolyte material element of sodium beta-alumina which has a single aperture through its center thus providing a flange or ring configuration. A pair of moderately deformable metallic elements of aluminum are provided. One element is in the form of a casing having opposite open ends and a flange portion at one end. The other element is an aluminum foil. The flange portion of the casing is positioned against one major surface of the sodium beta-alumina element while the aluminum foil is positioned against the opposite major surface. Each aluminum element provides an anode, while graphite paint applied to the sodium beta-alumina electrolyte provides a cathode. The assembly of the sodium beta-alumina element and the aluminum elements is heated in a furnace at a temperature of 500° C. A power source in the form of a battery is provided for each cathode and anode pair. The negative lead of the battery is attached to the cathode, while the positive lead is attached to the anode. An electric potential is applied across each aluminum element and the sodium beta-alumina electrolyte from the power source at the same time to thereby pass a finite current of low amperage through the adjacent metallic and sodium beta-alumina electrolyte elements. Effective bonding between the metallic elements and the sodium beta-alumina electrolyte element was accomplished by a current density of one milliampere per square centimeter for a period of one hour. The surface portion of the sodium beta-alumina electrolyte is converted to an aluminum ion-insulating material which is positioned adjacent each of the aluminum elements.

EXAMPLE VIII

A composite body is made as in Example VII except that each of the two aluminum elements are separately bonded to the opposite major surfaces of the sodium beta-alumina element.

While other modifications of the invention and variations thereof which may be employed within the scope of the invention have not been described, the invention is intended to include such as may be embraced within the following claims.

What I claim as new and desire to secure by Letters Patent of the United States is:

1. A composite body comprising a substrate with opposite major surfaces, the substrate comprising a solid ion-conductive electrolyte material region and at least a portion of at least one major surface of a solid ion-insulating material region, and a moderately deformable metallic element bonded directly to the ion-insulating material of the substrate, the metal of the metallic element different from the metal of the mobile ions of the solid metallic ion-conductive electrolyte material region.

2. A composite body as in claim 1, in which the substrate has at least one aperture therethrough.

3. A composite body as in claim 1, in which the solid ion-insulating material region of one major surface of the substrate is bonded to the deformable metallic element.

4. A composite body as in claim 1, in which the solid ion-insulating material region of a portion of one major surface of the substrate is bonded to the deformable metallic element.

5. A composite body as in claim 1, in which the solid ion-insulating material region of both major surfaces of the electrolyte material element are bonded to deformable metallic elements.

6. A composite body as in claim 1, in which the solid ion-insulating material region of a portion of both major surfaces of the electrolyte material element are bonded to deformable metallic elements.

7. A composite body as in claim 1, in which the solid ion-insulating material region of one major surface of the electrolyte material element is bonded to a deformable metallic element, and a portion of the other major surface of the electrolyte material element is bonded to a second deformable metallic element.

8. A composite body as in claim 1, in which the deformable metallic elements are made of aluminum, and the substrate is made of an ion-conducting region of sodium beta-alumina and an ion-insulating region of an aluminum substituted beta-alumina.

* * * * *